United States Patent
Chinthekindi et al.

(10) Patent No.: US 11,580,015 B2
(45) Date of Patent: Feb. 14, 2023

(54) GARBAGE COLLECTION FOR A DEDUPLICATED CLOUD TIER USING FUNCTIONS

(71) Applicant: EMC IP Holding Company LLC, Hopkinton, MA (US)

(72) Inventors: Ramprasad Chinthekindi, San Jose, CA (US); Philip Shilane, Newtown, PA (US); Abhinav Duggal, Colma, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 131 days.

(21) Appl. No.: 16/402,288

(22) Filed: May 3, 2019

(65) Prior Publication Data

US 2020/0349066 A1    Nov. 5, 2020

(51) Int. Cl.
| | |
|---|---|
| *G06F 12/02* | (2006.01) |
| *G06F 11/14* | (2006.01) |
| *G06F 3/06* | (2006.01) |
| *H04L 67/1095* | (2022.01) |

(52) U.S. Cl.
CPC .......... *G06F 12/0253* (2013.01); *G06F 3/067* (2013.01); *G06F 3/0608* (2013.01); *G06F 3/0647* (2013.01); *G06F 11/1453* (2013.01); *H04L 67/1095* (2013.01)

(58) Field of Classification Search
CPC .. G06F 12/0253; G06F 3/0608; G06F 3/0652; G06F 3/067; G06F 9/45558; G06F 2009/45562; G06F 2009/45595; G06F 3/0647; G06F 11/1453; H04L 67/1095
See application file for complete search history.

(56) References Cited

U.S. PATENT DOCUMENTS

| | | | |
|---|---|---|---|
| 9,411,815 B1* | 8/2016 | Lu | G06F 11/1453 |
| 9,794,061 B1* | 10/2017 | Bushman | G06F 21/602 |
| 9,959,280 B1 | 5/2018 | Whitehead et al. | |
| 10,078,583 B1* | 9/2018 | Wallace | G06F 11/1453 |
| 10,235,285 B1 | 3/2019 | Wallace | |
| 2005/0256864 A1* | 11/2005 | Semerdzhiev | G06F 16/10 |
| 2013/0191626 A1* | 7/2013 | Kuno | H04N 21/63345 |
| | | | 713/150 |

(Continued)

FOREIGN PATENT DOCUMENTS

EP         3367292         8/2018

OTHER PUBLICATIONS

PCT/US2020/023578, Jul. 6, 2020, International Search Report and Written Opinion.

(Continued)

*Primary Examiner* — Andrew J Cheong
(74) *Attorney, Agent, or Firm* — Workman Nydegger

(57) ABSTRACT

Systems and methods for performing data protection operations including garbage collection operations and copy forward operations. For deduplicated data stored in a cloud-based storage or in a cloud tier that stores containers containing dead and live segments or dead and live regions such as compression regions, the dead compression regions are deleted by copying the live compression regions into new containers and then deleting the old containers. The copy forward is based on a recipe from a data protection system and is performed using a serverless approach.

18 Claims, 8 Drawing Sheets

(56) References Cited

U.S. PATENT DOCUMENTS

| | | | |
|---|---|---|---|
| 2015/0356110 A1* | 12/2015 | Lin | G06F 16/1827 |
| | | | 707/704 |
| 2017/0169233 A1* | 6/2017 | Hsu | G06F 21/602 |
| 2018/0196743 A1* | 7/2018 | McVay | G06F 3/0688 |
| 2019/0362081 A1* | 11/2019 | Kanno | G06F 3/0688 |
| 2021/0096898 A1* | 4/2021 | Tsirkin | G06F 12/10 |
| 2021/0294502 A1* | 9/2021 | Wang | G06F 3/0641 |

OTHER PUBLICATIONS

U.S. Appl. No. 16/395,984, filed Apr. 26, 2019, Duggal et al.
U.S. Appl. No. 16/395,966, filed Apr. 26, 2019, Shilane et al.
International Search Report and Written Opinion received for PCT Patent Application No. PCT/US2019/068013, dated Apr. 24, 2020.
International Search Report and Written Opinion received for PCT Patent Application No. PCT/US2019/068028, dated Apr. 20, 2020.
U.S. Patent Application filed Apr. 26, 2019, by Duggal et al., Entitled "Garbage Collection for a Deduplicated Cloud Tier,", U.S. Appl. No. 16/395,984.
U.S. Patent Application filed Apr. 26, 2019, by Shilane et al., Entitled "Garbage Collection for a Deduplicated Cloud Tier,", U.S. Appl. No. 16/395,966.
U.S. Patent Application filed May 3, 2019, by Chinthekindi et al., U.S. Appl. No. 16/402,288.

* cited by examiner

GC Cost metrics using copy forward GC

| | MONTHLY GC COST | | |
|---|---|---|---|
| | | STANDARD | STANDARD IA |
| Storage Cost | | -$2,126.25 | -$1,265.63 |
| | TRANSACTION COST | | |
| Number of objects read | 3317760000 | | |
| Cost of GETs from CT | | $ 1,327.10 | $ 3,317.76 |
| Data Retrieval Cost | | $ — | $ 2,025.00 |
| Data transfer cost (upto 10TB)/month | | $ 921.60 | $ 921.60 |
| Data transfer cost (upto 40TB)/month | | $ 3,481.60 | $ 3,481.60 |
| Data transfer cost (upto 150TB)/month | | $ 10,591.00 | $ 3,423.00 |
| Total Data Transfer Cost | | $ 14,994.20 | $ 7,826.20 |
| Number of objects written | 26542080 | | |
| Cost of PUTS to CT | | $ 132.71 | $ 265.42 |
| Data Write Cost | | $ — | $ — |
| Total Transaction Cost | | $ 16,454.01 | $ 13,434.38 |
| TOTAL GC Cost | | $14,327.76 | $12,168.76 |

Figure 7

GARBAGE COLLECTION FOR A DEDUPLICATED CLOUD TIER USING FUNCTIONS

FIELD OF THE INVENTION

Embodiments of the invention relate to systems, methods, and apparatus for protecting data. More particularly, embodiments of the invention relate to data protection operations including backup operations, restore operations, deduplication operations, and garbage collection operations. More specifically, embodiments relate to systems and methods for collecting garbage in a deduplicated cloud tier.

BACKGROUND

In many computing systems, data is often stored locally or on-site in an on-premise network. For many reasons, some entities desire to move at least some of their data to a target site such as a cloud-based storage system (the cloud). To reduce the storage costs associated with the cloud, it is useful to deduplicate the data before the data is written to the cloud. Entities that store their data in a deduplicated manner in the cloud may have the expectation that their cloud storage costs will decrease as data is deleted. This is not always true.

It turns out that deleting the objects can incur cost. This is due to deduplication. As new objects are written to the cloud, parts of data in previous object may be referenced by new files. When old objects are deleted, not everything in the objects becomes unreferenced. To delete the unreferenced portions, the objects need to be defragmented by reading the referenced parts of these objects and writing them into new objects. While writing to the cloud is inexpensive and often free, reading data from the cloud can be expensive. More specifically, in the context of conventional garbage collection operations, there is a need to transfer large amounts of data. Reading and transferring the data is expensive.

For example, transferring data from a cloud service provider may cost $0.0.09 per GB for the first 10 TB transferred. The cost of reading 1 TB per week is about $4,800 per year. Entities that are deleting many TBs of data may incur high network costs during garbage collection operations at least because of the need to transfer the data back to the local system in order to properly delete data that is stored in a deduplicated form.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 7 illustrates a cost analysis.

DETAILED DESCRIPTION OF SOME EXAMPLE EMBODIMENTS

Embodiments of the present invention generally relate to data protection and to systems, methods, and apparatus for performing data protection operations. Examples of data protection operations include, but are not limited to, backup operations, restore operations, replication operations, disaster recovery operations, disaster recovery testing operations, failover or partial failover operations, data synchronization operations, replication operations, garbage collection operations, copy forward operations, or the like or combination thereof. More particularly, embodiments of the invention relate to systems, hardware, software, computer-readable media, and methods for performing data protection operations including garbage collection operations in the cloud.

Embodiments of the invention relate to a data protection system (e.g., DELL EMC DATA DOMAIN) that includes or provides, by way of example, a local or active tier for data storage and a cloud tier for data storage. More particularly, embodiments of the invention relate to garbage collection operations that are performed on the active tier and/or the cloud tier. In deduplicated storage systems, the data (objects, files, etc.) are often chunked into chunks or segments. A garbage collection operation is performed to remove the segments that no longer correspond to data that should still be stored in the storage system. Unreferenced segments are examples of dead segments and can be removed by the garbage collection operation while live segments should not be removed by the garbage collection operation. Removing dead segments can reduce storage requirements.

The data protection system may be an on-site installation that provides an active tier of storage and a customer may use the cloud tier for certain data. Like the on-premise data, data in the cloud is deduplicated and may be stored in containers that include compression regions of segments.

Figure 1A:
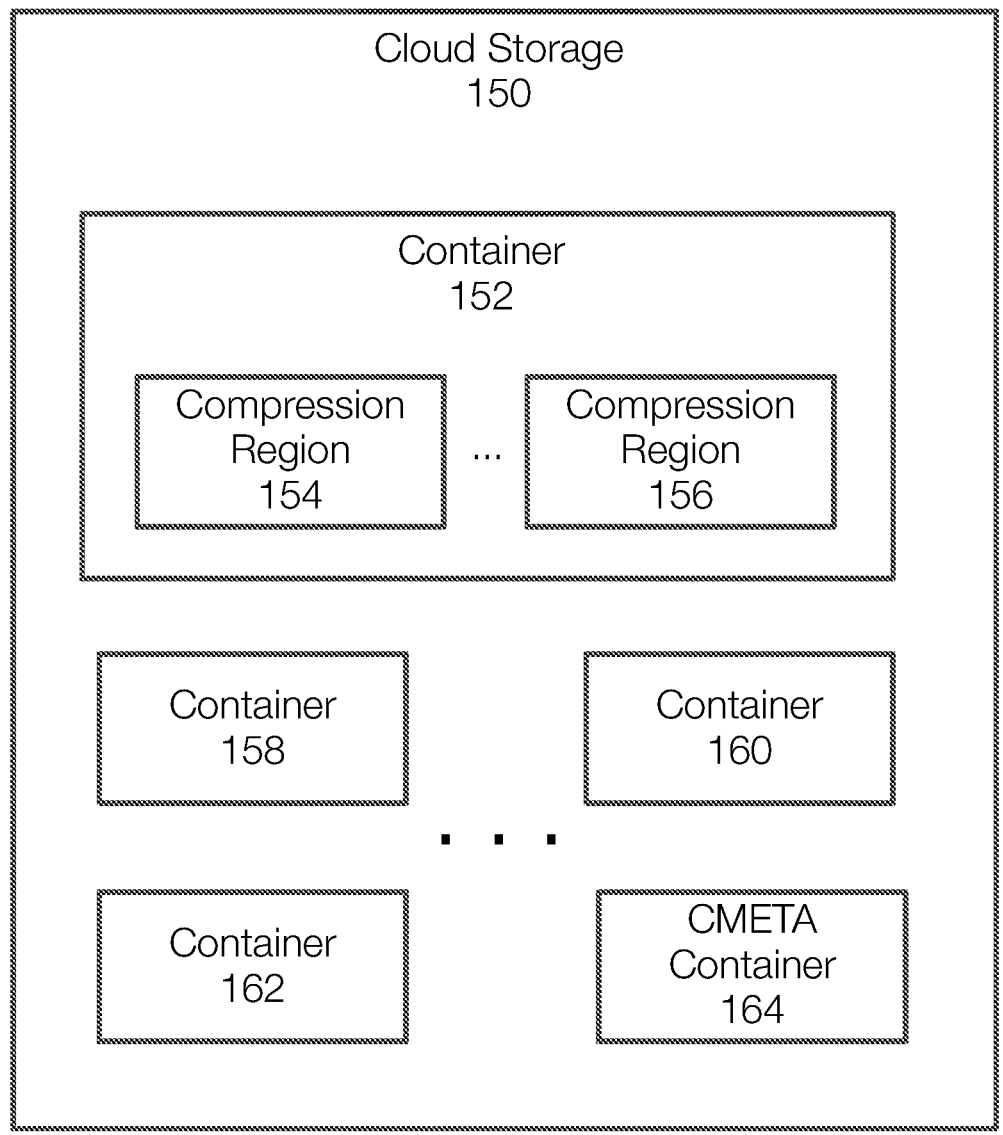
FIG. 1A illustrates an example of data stored in containers in a cloud storage system.

FIG. 1A illustrates an example of data stored in cloud storage. FIG. 1A illustrates a cloud storage 150. The data of a user may be stored in containers in the cloud. In this example, the cloud storage 150 includes containers, which are represented as containers 152, 158, 160, 162 and 164. The number of containers is not limited, and the containers may be of different types. Some containers, such as the containers 152, 158, 160 and 162 may store segments in compression regions. Containers such as the container 164 (CMETA containers) may be metadata containers and may be configured to store metadata. The metadata may also be stored as segments and thus the CMETA containers can also be cleaned as metadata becomes dead.

The container 152, for example, stores segments in compression regions. The compression regions of the container 152 are represented as compression regions 154 and 156. Each compression region includes segments of data. Thus, the compression regions 154 and 156 may each store some number of segments. The compression regions 154 and 156 may also be compressed and/or encrypted.

As described in more detail below, the compression region 154 (like other compression regions) may contain both live segments and dead segments. To clean the container 152, for example, compression regions that are at least partially live (or that include any live segments) can be copied forward into a new container. Compression regions that are dead or that do not contain any live segments are not copied forward. Once the live compression regions are copied forward into a new container, the source or old container can be deleted. This reclaims storage space by removing the dead compression regions from the containers. For example, if the compression region 154 is considered live and the compression region 156 is considered dead, the garbage collection operation may copy the compression region 154 into a new container and then delete the container 152 to remove the compression region 156 and the old version of the compression region 154. These changes are reflected in the CMETA container 164 (which may be cleaned in a similar manner). This ensures that the data protection system is aware of the locations of the segments and is able to perform deduplication.

By identifying specific compression regions, the container 152 can be cleaned without decompressing and/or decrypting the compression regions or segments stored therein.

Thus, to free up storage space after data deletions, live compression regions (including partially live compression regions) are copied from an old container to a new container, and the old container is then deleted. More specifically, or live compression regions are copied to the new container (an example of copy forward) and, by deleting the old container, the dead segments or dead compression regions are deleted. In this manner, storage requirements can be reduced because the storage space previously used to store dead compression regions is no longer needed. Thus, the dead segments are effectively removed.

In addition, the copy forward operation can be performed without having to compress and/or decrypt the compression regions when the garbage collection operation is applied to the compression regions or to ranges of data in the containers. In this case, the starting addresses or offsets of the compression regions are known to the data protection system and are included in or can be derived from locally stored metadata. As a result, live compression regions can be copied forward by identifying the source containers, the starting addresses of the live compression regions in the source containers, the sizes of the compression regions, and destination containers for the live compression regions begin copied forward.

The deduplication may be managed by the on-premise appliance or the on-premise data protection system and embodiments of the invention reduce costs by reducing the reads and data transfer to the on-premise data protection system using instructions or recipes such that the larger data transfers or copy forwards can occur within the cloud itself (intra-cloud transfer does not incur cost). This substantially reduces the amount of data that would otherwise be transferred across the network to the on-premise system.

Embodiments of the invention advance the functioning of the system and relate to a serverless architecture that can receive instructions from the on-site or on-premise data protection system. The data protection system maintains metadata that allows the data to be deduplicated and that allows the live compression regions and/or the dead compression regions in the cloud tier (and the active tier) to be identified and cleaned. This information included in or derived from the metadata allows instructions to be generated and sent to the cloud for execution. The instructions from the data protection system may include a recipe that describes which compression regions to copy forward. These recipes can be applied to copy forward the live compression regions from the existing containers to new containers. This eliminates network transfer significantly and dramatically lowers customer costs while supporting fine-grained cleaning of the data stored in the cloud tier. More generally, embodiments of the invention allow the on-premise data protection system to be cleaned of dead segment by identifying ranges of data that are considered live or partially live and then copying forward those ranges. In one example, this allows storage space to be reclaimed without having the decompress/decrypt the cloud objects. In one example, the ranges may or may not coincide with boundaries of the compression regions.

An architecture for performing a garbage collection operation includes a garbage collection engine of the data protection system (e.g., DATA DOMAIN) that is able to access functions in a serverless cloud system (such as Amazon Lambda) by, in one example, writing an instruction to storage or to a specified URL (uniform resource locator). Once the instruction is written to the specified URL or other event is detected, the functions are instantiated and performed based on the instruction or the information included in the instruction. The GC engine thus initiates the garbage collection operation that is then performed by function instances in the serverless architecture in the cloud tier of data.

Figure 1B:
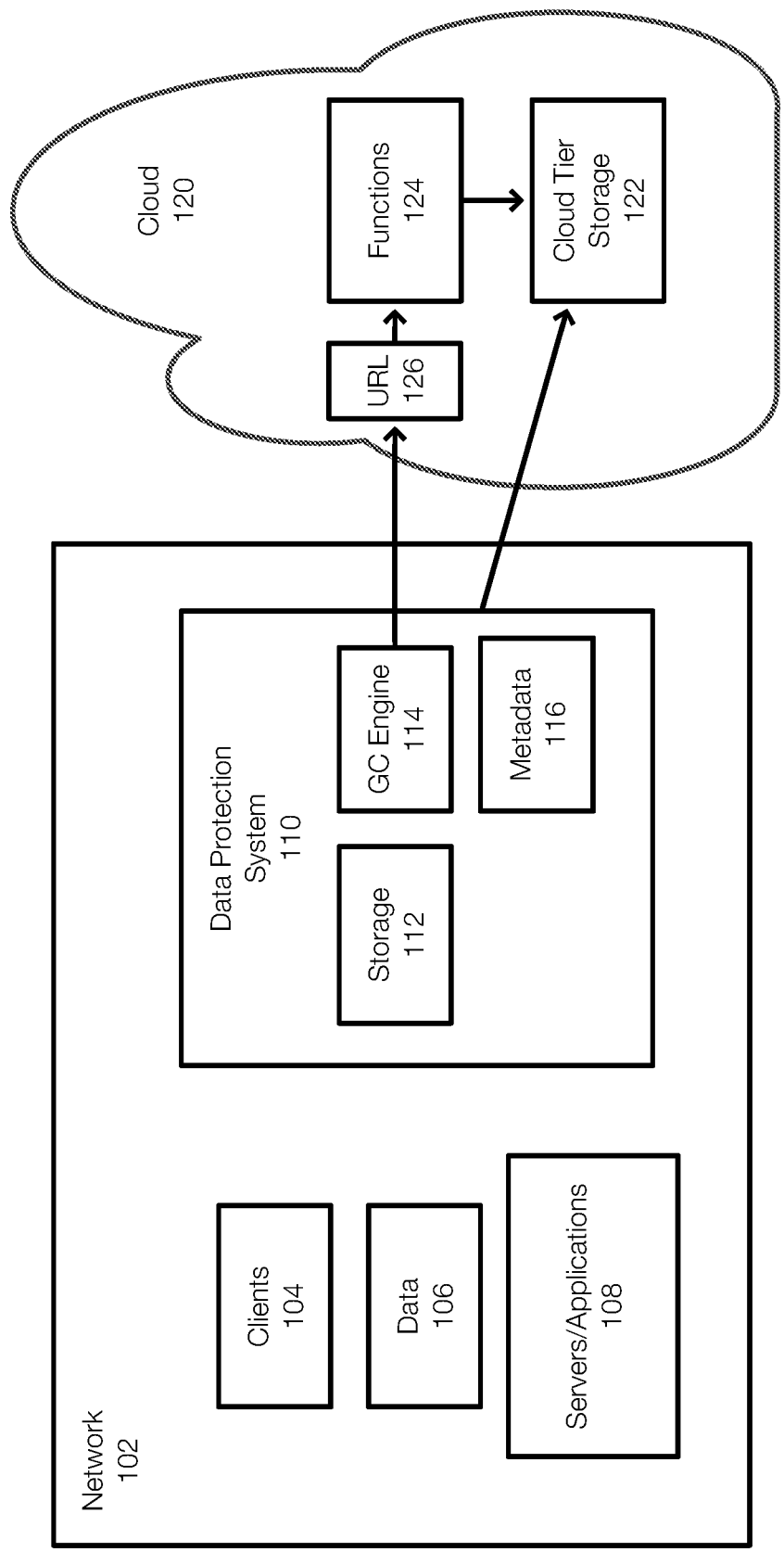
FIG. 1B illustrates an example of a data protection system that provides data protection operations including deduplication and garbage collection in an on-premise active tier and a cloud tier.

FIG. 1B illustrates an example of a system that includes or is associated with a data protection system 110 (e.g., DELL/EMC Data Domain). The data protection system 110 may be implemented, for example, as an appliance (physical or virtual) or using a server/agent configuration.

FIG. 1 illustrates a network 102. The network 102 is representative of an on-premise computing system and may be associated with servers/applications 108 (e.g., database, email, file servers, virtualization). The clients 104 are able to use and access the servers and applications 108 over the infrastructure of the network 102. The network 102 is also associated with data 106 that may be stored on storage devices. The data 106 may be stored on storage devices and backed up by the data protection system 110 using storage 112.

The data protection system 110 provides data protection services that may include, but are not limited to, backup operations, restore operations, deduplication operations, garbage collection operations, or the like. The data protection system may provide storage 112 (also referred to as active or local tier). Backups of the data 106 (and/or virtual machines, applications, objects (e.g., files) may be stored in the storage 112. Further, the storage 112 may be deduplicated by the data protection system. The data protection system 110 may also include a garbage collection (GC) engine 114 that is configured to remove unreferenced objects or segments from the storage 112.

The data protection system 110 may also provide or be associated with cloud storage (cloud 120). In one example, the cloud 120 may be used to provide tier storage 122 (also referred to as a cloud tier). The data protection system 110 can use the tier storage 122 to store some of the data that is stored on the storage 112. For example, a customer may select certain files or data from the storage 112 that should be migrated to and stored in the cloud tier storage 122. The data protection system 110 can thus write objects to the cloud tier storage 122, delete objects from the cloud tier storage 122, and perform other file or object-based operations on the cloud tier storage 122.

At the same time, the data protection system 110 may be responsible for deduplicating the data at both the storage 112 and the cloud tier storage 122. The data protection system 110 may also maintain metadata 116 that identifies live and/or dead segments in the storage 112 and/or the storage 122 or that allows the live and/or dead segments to be identified. More broadly, the metadata 116 allows live/dead compression regions to be identified. Thus, the data protection system 110 may also be able to identify live or partially live ranges and/or dead ranges (e.g., dead/live compression regions) of data. In one example, the identification of a live segment effectively identifies the associated compression region as a live compression region. It may not be necessary to iterate or evaluate all segments associated with a compression region once it is established that the compression region is a live compression region.

The data protection system 110 is configured to minimize or reduce data transfer requirements, at least in the context of garbage collection, to/from the cloud and is configured to determine the live compression regions and is configured to clean the containers by removing or at least partially removing dead compression regions from the cloud tier storage 122, thereby removing dead segments. Metadata 116 stored locally at the data protection system 110 allows the GC engine 114 to determine the liveness of segments or compression regions and make decisions about which data (e.g., ranges, compression regions) to copy forward from an existing cloud container to new cloud containers in the cloud tier storage 122 during the garbage collection operation.

Figure 2:
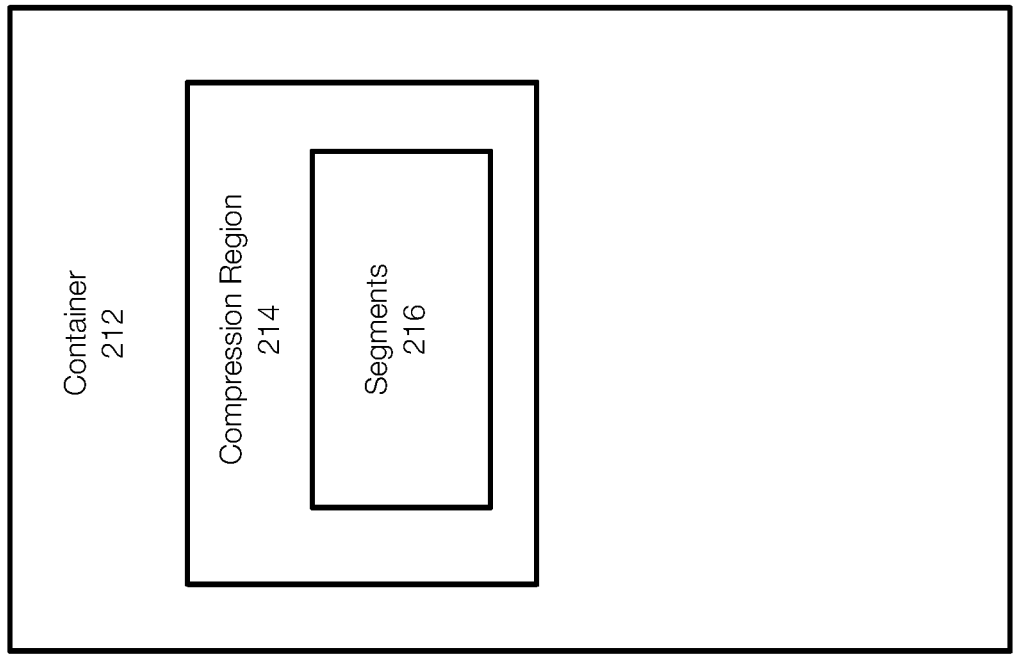
FIG. 2 illustrates an example of copying forward a container in the cloud tier.
Figure 2:
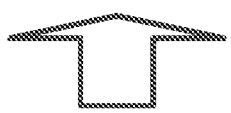
Figure 2:
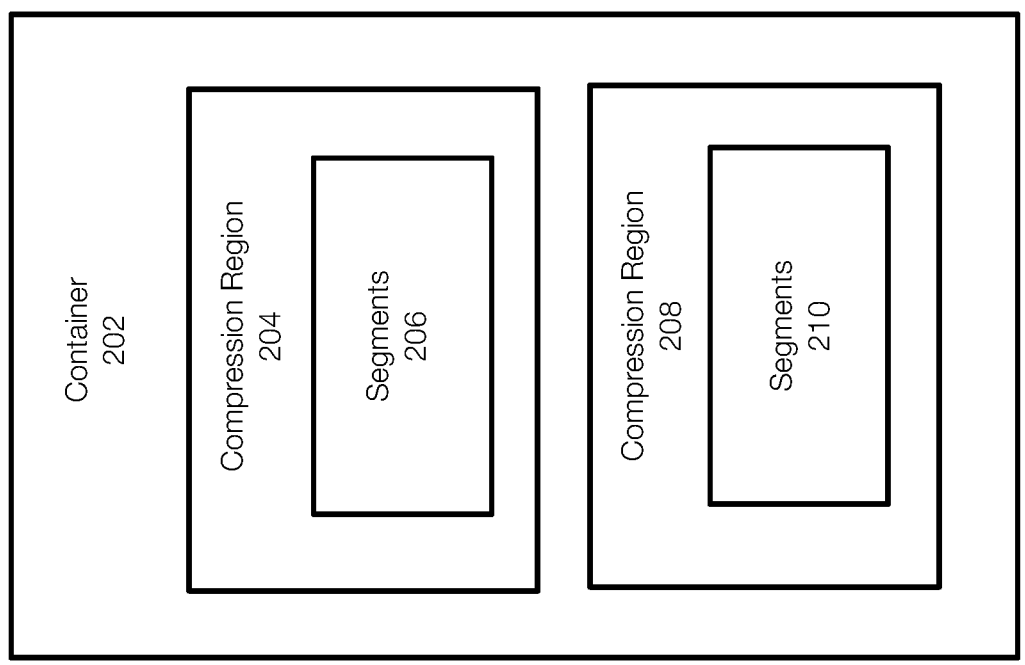

FIG. 2 illustrates an example of containers stored in the cloud tier and illustrates the copy forward process. FIG. 2 illustrates a container 202. In this example, the container 202 is an existing container that is present in the cloud before the garbage collection operation begins. The container 202 includes compression regions (represented by compression regions 204 and 208). The compression region 204, like the other compression regions of the container 202, includes segments 206. The compression regions 208 includes segments 210.

At the beginning of a garbage collection operation, the GC engine 114 may determine that at least some of the segments 206 includes live segments. The GC engine 114 may also determine that none of the segments 210 are live segments. In other words, the GC engine 114 can determine that the compression region 208 is a dead compression region and that the compression region 204 is a live compression region. In one example, a compression region is live as long as the compression region includes at last one live segment.

During the garbage collection operation, a new container 212 is created. The new container 212 when written, will include compression regions (represented by a compression region 214). The compression region 214, like the other compression regions, will include segments 216 when written. During a copy forward procedure when writing to the container 212, the live compression regions of the container 202 may be written into the container 212. In this example, the compression region 204 is written into the container 212 as the compression region 214. Thus, the segments 216 are the same as the segments 206 in one example when the garbage collection operation is performed at the compression region level. At this level, fully dead compression regions such as the compression region 208 are deleted by the garbage collection operation. More specifically, the compression region 208 is deleted because the compression region 208 is not copied forward. Then the container 202 is deleted.

During garbage collection, the live compression regions written into the new container 212 may come from multiple source containers. In addition, metadata is created and stored as necessary such that the new locations of the compression regions, their contents and the location of the segments 216 is maintained by the data protection system.

When performing the garbage collection operation at the compression region level, the compression region 204 is copied forward by copying forward based on the location of the compression region 204 within the container 202. In this example, the GC engine may write an instruction or recipe to the URL 126 shown in FIG. 1B. This event triggers functions that perform the copy forward operations. In this example, the instruction written to the URL 126 (or other event) may include an identifier of the container 202, a start location of the compression region 204 within the container 202, and a size of the compression region 204. This allows the functions 124 (see FIG. 1B) instantiated by the event of writing a recipe or instruction to the URL 126 to copy the compression region 204 into the container 212. Further, the compression regions 204 can be copied forward without understanding the format of the compression region 204 and without having to perform computationally expensive procedures such as decompression and/or decryption. In other words, the compression region 204 can be copied forward while in a compressed and/or encrypted state.

Embodiments of the invention allow copy-forward decisions without network transfer of data back to the source site (e.g., the network 102). Network transfer can be avoided by creating functions that are executed in response to an event. These functions or instances have an advantage in that they can read cloud containers and transfer data intra-cloud without the transfer cost of reading back to the on-premise data protection system 110. When the garbage collection operation completes, the functions exit, so computational costs remain low.

When cleaning at the compression level, a recipe from the data protection system that is written to the URL 126 may include a series of instructions such as:

Copy from Container A, from Start1 of Length1 bytes to Container C.

Copy from Container A, from Start2 of Length2 bytes to Container C.

Copy from Container B, from Start3 of Length3 bytes to Container C.

Confirm Container C has Checksum value and write to object storage.

Delete Containers A and B.

While the above example recipe focuses on byte ranges being copied from an old container to a new container, these byte ranges can be selected to align with compression regions within a container.

As an integrity check, a checksum may be calculated over the fingerprints within the container when the data protection system does not have the segments themselves and only has their references. The fingerprints are stored in the metadata 116 associated with the containers in the cloud. Metadata may also be stored in the cloud that relates to the segments, compression regions, and containers stored in the cloud.

Figure 3:
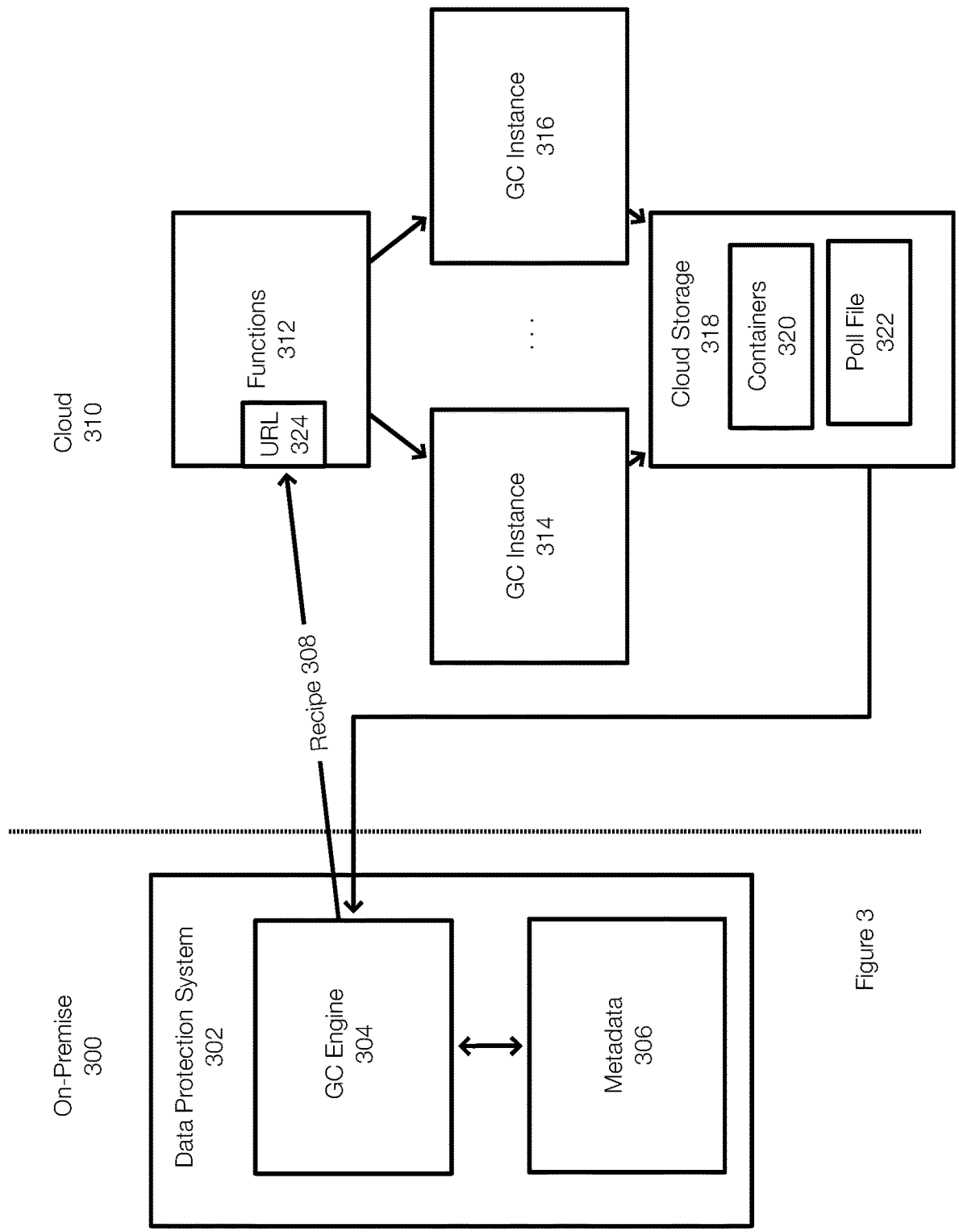
FIG. 3 illustrates an example of a cloud-based serverless architecture configured to perform a garbage collection operation on cloud tier of data stored in a cloud-based storage.

FIG. 3 illustrates systems and methods for performing a garbage collection operation in the context of a system 300

(e.g., an on-premise system) that is associated with an active tier and a cloud system 310 that is associated with a cloud tier. FIG. 3 illustrates a data protection system 302 (an example of the data protection system 110) that includes a GC engine 304 and that has access to metadata 306 that is related to the containers 320 stored in the cloud 310. The containers 320 may each include compression regions. However, some of the containers may store CMETA (container metadata). Thus, the cloud storage 318 may also store other containers such as CMETA containers.

During a garbage collection operation, the GC engine 304 may access the serverless functions by writing a recipe 308 to a URL 324 (may also be an API) or by performing another action that results in the execution of the functions 312. The function 312 are configured to clean the containers 320. As illustrated, the data protection system 302 or the GC engine 304 instantiates the functions 312 in the cloud by performing an event that invokes the functions 312. The functions 312 interact with and clean the containers 320 in the cloud storage 318 without incurring data transfer costs as previously described. More specifically, the GC instances 314 and 316 are specific instances of the functions 312. Each of the instances 314 and 316 may perform a different recipe. For example, each may work on a different set or range of containers.

The garbage collection operation is scalable and may work on a batch of containers. For example, the containers can be processed in batches (also referred to as a range of containers). When processing the first batch, the GC engine 308 may configure the recipe to allocate a portion of the batch to the functions 312. The range of containers may be specified in the instruction or recipe 308. When multiple functions are instantiated, each function can work on a different portion of the batch. This allows the batch to be cleaned in parallel. Batches can be processed in succession.

FIG. 3 also illustrates a poll file 322. The poll file 322 may be created by the instances 314 and 316 when the garbage collection or copy forward aspect of garbage collection is completed. The GC engine 304 can poll the cloud storage 318 periodically and when the poll file 322 is present, the GC engine 304 understands that the functions have completed. In one example, the poll file 322 may include a checksum for the new containers that can be compared to a locally stored checksum to confirm the garbage collection operation.

Figure 4:
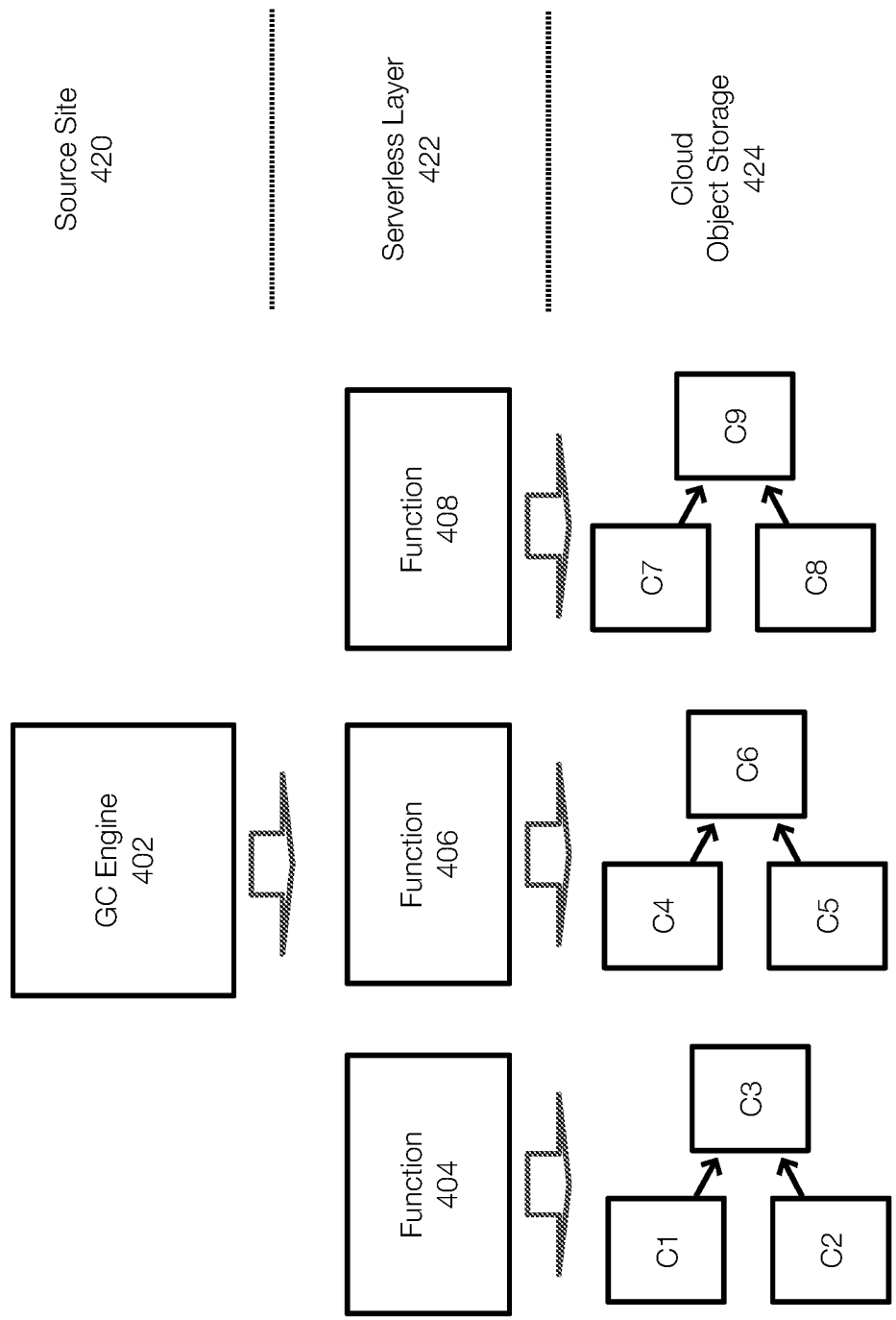
FIG. 4 illustrates another example of a serverless architecture configured to perform a garbage collection operation including copy forward on a cloud tier of data.

FIG. 4 illustrates an example of remote garbage collection using a serverless configuration (e.g., Amazon Lambda). A serverless configuration may include functions or multiple function instances that can be triggered by events (e.g., such as by accessing a URL or API).

FIG. 4 illustrates a source site 420 (e.g., the on-premise site) that includes a GC engine 402 as part of a data protection system. When the GC engine 402 starts, the GC engine 402 may start, configure, and deploy GC functions 404, 406 and 408 in a serverless layer 422 in the cloud. More specifically, the GC engine 402 may generate a recipe or an instruction that includes sufficient information to clean containers stored in the cloud object storage 424. When this recipe or instruction is written to a specified URL, for example, the functions 404, 406, and 408 are instantiated and the recipe is performed on the containers in the cloud object storage. The recipe may configure the operating parameters of the functions 404, 406 and 408.

Once the functions 404, 406 and 408 are deployed and running, the containers are cleaned by copying forward the live ranges specified in the instruction or recipe. When the instruction is at the compression region level, live compression regions (identified by offsets and sizes as previously discussed) are copied forward. In this example, the live compression regions from the containers C1 and C2 are copied into the container C3, live compression regions from the containers C4 and C5 are copied into the container C6, and live compression regions from the containers C7 and C8 are copied into the container C9. Once the copy forward is completed, the containers C1, C2, C4, C5, C7 and C8 are deleted and the poll file or poll files are created in the cloud storage.

In one example in a serverless configuration, the copy-forward method or process is packaged within the serverless framework. The data protection system then accesses the appropriate URL and supplies values specifying the recipe to apply.

The GC engine 402 may create a recipe for each instance of the functions 404, 406, and 408 (e.g., each function handles a range of containers). The GC engine 402 creates a recipe and writes the recipe to the object storage 424 or other specified URL. The specified URL may be the object storage 424. This event triggers the functions 404, 406 and 408. When the event is detected, the recipe can be parsed. When recognized as a recipe, the functions corresponding to the event that can perform the recipe are invoked.

When the functions 404, 406 and 408 have finished, they may be configured to write a poll file or other object to the object storage 424. In one example, a checksum may be written to the object storage 424. The GC engine 402 may poll the object storage 424 periodically to check for the checksum or other object. When the object or checksum is present, the checksum can be compared to a locally stored checksum as previously stated. This may confirm that the copy forward operations were performed properly. In addition, CMETA containers are written at the source site 420 and replicated to the cloud storage 424.

A container may have, by way of example only, two parts: a metadata section and data sections or compression regions. In the data section, each compression region includes a bunch of compressed segments. For each segment, a fingerprint may be calculated for deduplication purposes. The metadata section represents or stores the meta information of the container and may include various fields such as, but not limited to: how many compression regions are in the container, compressed and uncompressed sized of the compression regions, number of segments in each compression regions, total number of segments in the container, and a table of the fingerprints of all of the segments stored in the container.

Figure 5:
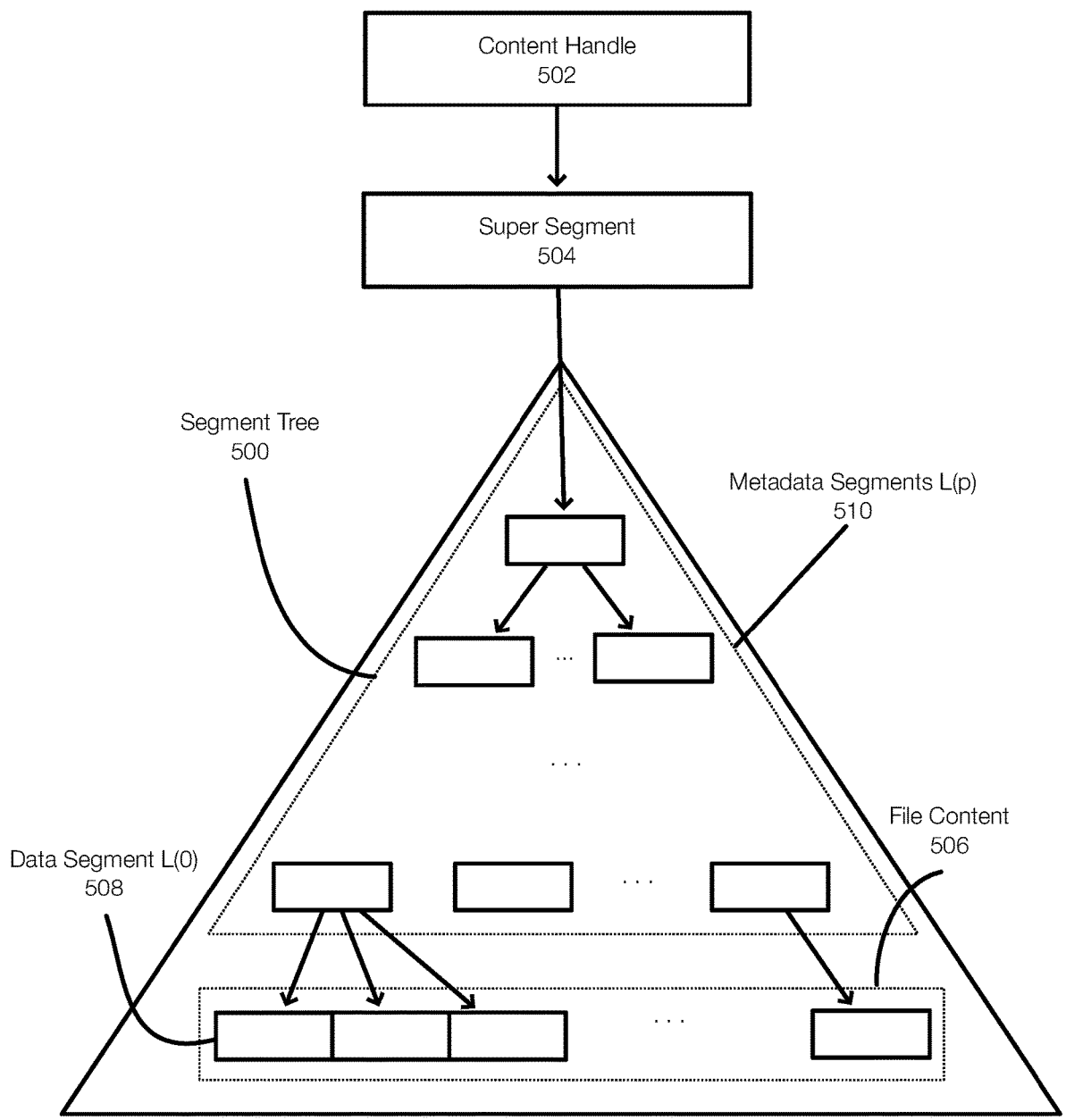
FIG. 5 illustrates an example of how objects or files may be represented in cloud storage and how objects are stored in the containers.

FIG. 5 illustrates an example of how a file, or an object may be represented in the active tier or in the cloud tier. A storage system may represent objects or files as a segment tree as illustrated in FIG. 5. A content handle 502 may point to a super segment 504 (which may be an example of an L6 segment). The metadata segments 510 may include Lp segments (e.g., L1 to L6 segments). Data segments L0 508 are the actual data of the file or object and may be stored in the leaf nodes of the segment tree 500. The metadata segments 510 and the data segments 508 are usually stored in separate containers. Thus, containers that store Lp segments may be referred to as Lp containers and containers that store L0 segments may be referred to as L0 containers.

A CMETA container is a container that stores metadata. More specifically, a CMETA container may store a collection of metadata sections of L0 and Lp containers. During garbage collection, the metadata (CMETA and Lp) is used to identify the live segments and the dead segments or to identify live compression regions and dead compression regions. In order to avoid reading the metadata from the cloud, the metadata (e.g., CMETA containers and Lp containers) is stored locally and is replicated to the cloud. L0 containers are only written to the cloud in one embodiment. In one embodiment, the data is thus deduplicated with respect to both the active tier and the cloud tier. In one example, CMETA containers and Lp containers are maintained locally and in the cloud.

During garbage collection, the GC engine may read the local CMETA containers. By reading the local CMETA containers, metadata of actual L0 containers and Lp containers can be obtained. This metadata may include fingerprints of all segments of the actual L0 and Lp containers.

Using this metadata, the GC engine may look up fingerprints to determine the live and dead compression regions or ranges of the Lp containers. The live compression regions or ranges of the existing Lp containers are then copied into new Lp containers. The new Lp containers are written locally and written to the cloud. Next, the metadata section of the new Lp containers are copied into a new CMETA container and the new CMETA container is written locally and as an object to the cloud.

Next, the metadata sections of the local CMETA containers are read to identify the live compression regions or ranges of source or existing L0 containers. This may be an iterative process. This allows a recipe (source_object_ID, offset, size) for live compression regions in the existing containers to be identified. These recipes are written to a URL so that the live compression regions can be copied forward into new containers or objects in the cloud by functions in a serverless architecture.

Next, the metadata corresponding to the compression regions in the new containers is copied forward into a new CMETA container locally and replicated to the cloud. Finally, the source Lp, L0 and CMETA containers (containers from which regions or ranges were copied forward) can be deleted to reclaim or release cloud space.

In deduplicated storage systems, as previously discussed, the containers may store different types of data. Some containers may store data segments (e.g., L0 containers) while other containers may store data used in storing and reconstructing objects (e.g., Lp containers). These containers can be similarly processed during garbage collection. These segments are stored in compression regions in one example.

In one example, the GC engine is aware of the containers that store the data in the cloud tier. For example, and with reference to FIG. 4, the GC engine stores or has access to metadata describing the containers C1, C2, C4, C5, C7 and C8. This allows source containers, live/dead compression regions, to be identified from the metadata and included in the recipes or recipes.

The recipe, in one example, may include a list of source containers to copy live ranges from, start locations and sizes of the ranges in the compression regions, destination container list, destination CMETA list. Thus, the recipe identifies the containers that are to be cleaned, ranges that identify live data regions such as live compression regions, the destination container list and the destination CMETA. This recipe is written to the appropriate location such that the functions are invoked in response. Once this process is complete in the cloud tier, the new CMETA containers are written locally and replicated to the cloud in one example. The CMETA containers correspond to the cloud tier containers and may contain metadata related to what is stored in the cloud tier. The CMETA containers thus enable deduplication. The Lp containers are also written locally.

When this process is completed and verified, the GC engine may poll the cloud object storage for a file to verify that the copy forward or garbage collection is complete and performed correctly.

By performing garbage collection with a serverless architecture in the cloud, the ingress/egress cost is avoided. There is, however, a compute cost of running these functions. As a result, the cost of a serverless approach can be compared with the cost of transferring these objects over the network (ingress/egress cost). In one example, when 50 million objects are read and 25 million objects are written (each object is 4 MB), the compute cost plus the request cost plus the get cost plus the put cost may be about $422 per garbage collection cycle. This is typically less than the costs associated with transferring these objects over the network.

Figure 6:
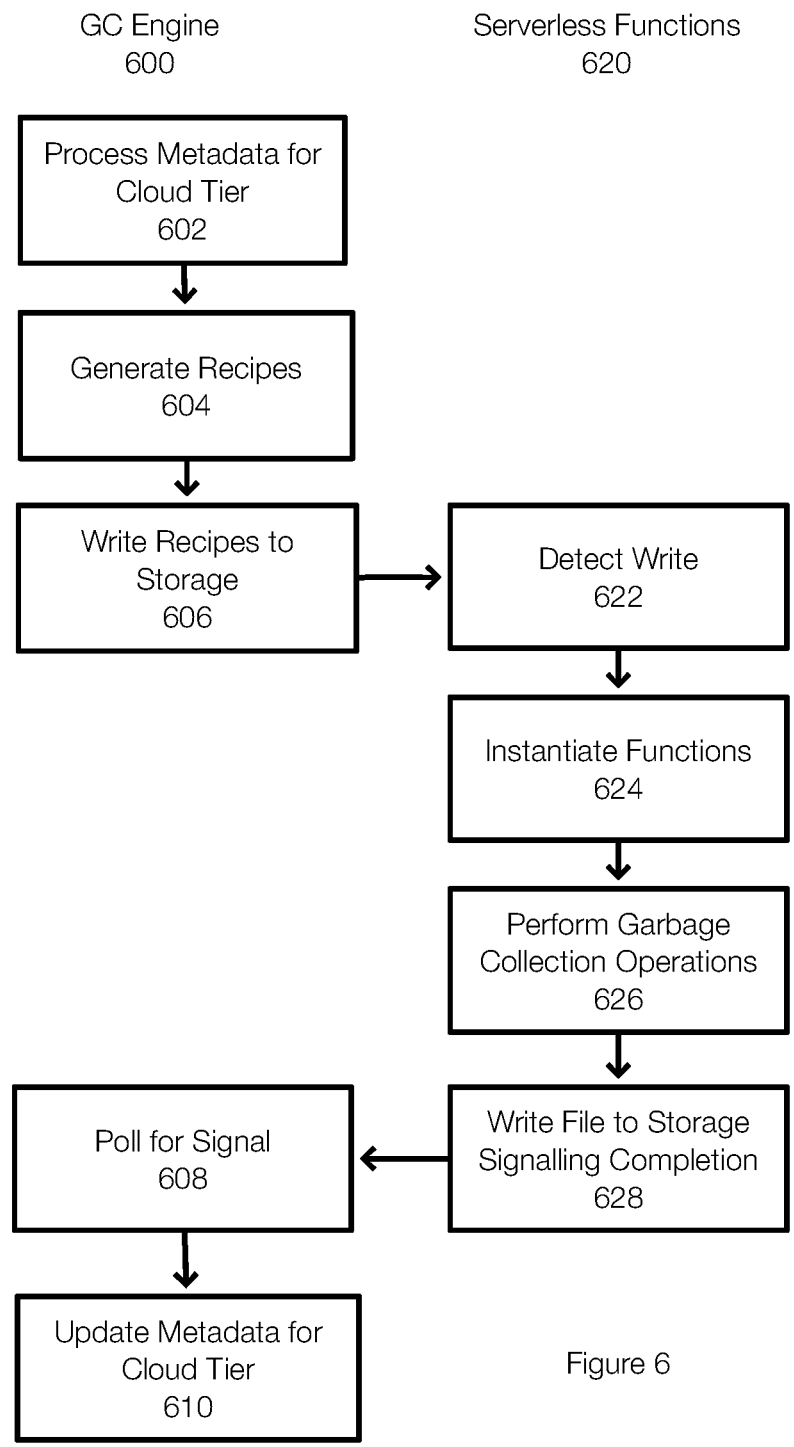
FIG. 6 illustrates an example of a method for performing garbage collection in a cloud tier.

FIG. 6 illustrates an example of a method for performing a data protection operation such as garbage collection on a cloud tier. FIG. 6 illustrates a method performed by the data protection system as a whole and illustrates aspects of a garbage collection operation that may be performed by various components. For example, the GC engine 600 may be located on-premise and may be configured to control data protection operations including garbage collection operations for the active tier and the cloud tier. Embodiments of the invention may also apply to a situation where the source is a cloud-based system.

The GC engine 600 may communicate with serverless functions 620 that are instantiated in the cloud in response to an event such as a write by the GC engine 600. The serverless functions 620 may be configured to manage the garbage collection operation in the cloud by performing or controlling the performance of recipes received from the GC engine 600. The serverless functions 620 may perform part of the garbage collection operation including copy forward.

The method shown in FIG. 6 may begin by processing 602 metadata for the cloud tier. The on-premise system typically stores metadata describing the containers stored in the cloud and processing the metadata may include evaluating the metadata for containers stored in the cloud tier to identify the liveness and deadness of the data stored in the containers. In one example, the metadata may allow the GC engine 600 to identify which compression regions include live segments and which compression regions only contain dead segments. As previously stated, the metadata may also be used to identify live/dead compression regions.

Because the GC engine 600 is aware of the locations of the compression regions, and other aspects of the containers and because the status of the segments and/or compression regions can be determined, recipes can be generated 604 such that the live ranges or compression regions can be copied forward. These recipes, at the compression region level, allow compression regions to be copied forward without regard to format, compression, or encryption.

More specifically in one example, the GC engine 600 is aware of how the data is compressed and/or encrypted. Thus, the size of the ranges in their compressed/encrypted form can be determined. In one example, this information is present in the CMETA, which describes the information stored in the containers.

The recipe generated by the GC engine 600 typically identifies a source container, data locations (e.g., offset or starting address in a container), length or size, and a destination container. This information allows the functions to copy data at the locations, which correspond to the live ranges or compression regions, to the new destination container.

Once generated, the recipes are written 606 to a specified location (a specific URL such as the object cloud storage). The write is detected 622 and evaluated. When the write is interpreted as a particular event, the functions corresponding to the detected event are instantiated 624. The recipe may be configured to invoke multiple functions or instances. Alternatively, multiple recipes may be sent such that each instantiated function operates on a different set of containers. The functions that are started thus receive the recipes and perform 626 garbage collection operations in accordance with the recipes.

The copy forward can be performed, for example, copying the ranges or compression regions identified in the recipes from the source containers to the new containers. This may be performed for both Lp containers and L0 containers. The CMETA for the new containers may be determined and stored in a new CMETA container. In one example, the new CMETA containers are created in a similar manner.

In one example, the functions may each write a poll file to the object storage, signaling 628 that the garbage operation is complete. These files may constitute checksums that can be compared to locally stored checksums available to the GC engine 600 to confirm that the garbage collection or copy forward operations have been properly performed. Thus, the GC engine 600 may poll 608 the object storage until these files are detected.

Once the files are detected and validated, the metadata for the cloud tier may be updated 610. This may include receiving metadata associated with the new containers. The metadata for the cloud tier is updated 610 by the GC engine 600. This may include generating new metadata containers locally and replicating the new metadata containers to the cloud.

FIG. 7 illustrates the cost of running GC once a month on a cloud provider. This cloud provider has two storage configurations—Standard and Standard Infrequent Access. The cost for other cloud providers is similar.

A 1 PB cloud tier is assumed in this example. From experience, it is determined that there can be a 10% churn per GC cycle. Thus, out of 1 PB, 100 TB of data is expected to be dead. Due the fragmentation, the live and dead data will be distributed in a container (i.e. a container will have both live and dead data). The average liveness of a container that is cleaned is 50% (i.e. 50% of segments are dead and 50% are live). Based on these assumptions, to clean 100 TB of dead data with 50% average liveness, GC needs to read 200 TB of data from the cloud and write 100 TB of new data to the cloud. If each object size is 4 MB, GC needs to read 200 TB/4 MB=52428800 objects and write 52428800/2=26214400 objects to the cloud. The transaction cost of PUT operations is $0.005 per 1,000 requests and the cost of get is $0.0004 per 1000 requests. Thus, the transaction cost to read 52428800 objects is $262 and $10 for writing. But the major cost is the data transfer cost—ingress/egress cost. The data transfer cost for 200 TB of read and 100 TB of write is $14,994 Standard storage and $7826 for infrequent access.

As illustrated in FIG. 7, the cost saved due to data cleaned is $2126.25 as the monthly data storage cost on the cloud is reduced.

The compute cost associated with a serverless configuration is examined. In one example, this configuration may have 16 cores, 64 GB of memory and costs $0.8 per hour. In addition, the speed of such an instance can also be varied. In one example, at least 200 MB/s copy speed can be achieved. If 8 instances are spun up, a speed of 1.6 GB/s can be achieved. In this example and at this speed, it will require about 12800 seconds or about 35 hours to copy forward 200 TB of data. This results in a cost of $227.

Embodiments of the invention thus achieve a reduction in cost per GC cycle on the order of 66x. Further, it is much faster as many instances as desired can be started or the number can be controlled based on the data to be copied. In comparison, to copy forward over a network is significantly more costly and slower. Assuming that the network has 100 MB bandwidth, 100 MB/s read cannot be achieved in the best-case scenario. Thus, embodiments of the invention conserves network bandwidth for data movement to the cloud rather than wasting network bandwidth on conventional garbage collection methods.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data management operations. Such data management operations may include, but are not limited to, data read/write/delete operations, data backup operations, data restore operations, data cloning operations, data archiving operations, and disaster recovery operations. Thus, while the discussion herein may, in some respects, be directed to a discussion of data protection environments and operations, the scope of the invention is not so limited. More generally then, the scope of the invention embraces any operating environment in which the disclosed concepts may be useful. By way of illustration, but not limitation, embodiments of the invention may be employed in connection with data backup and restore platforms such as the Dell-EMC NetWorker and Avamar and Data Domain platforms.

A data protection environment may take the form of a public or private cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices or entities disclosed herein may be protected by one or more data protection policies according to various embodiments of the invention. Yet other examples of devices that may be protected by way of a data protection policy according to embodiments of the invention include, but are not limited to, containers, and VMs.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, containers, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general-purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system that provides an active tier of data at an on-site installation and a cloud tier of data, a method for performing a garbage collection operation in the cloud tier that includes a cloud storage of a serverless cloud system, the method comprising:

processing metadata, stored in an active tier, for the cloud tier by a garbage collection engine of the on-site installation data protection system to identify containers in the cloud tier to be cleaned in the cloud storage, wherein the identified containers contain regions, wherein some of the regions include both dead segments and live segments;

generating recipes, by the garbage collection engine, that identify locations of the live segments in the identified regions of the identified containers based upon metadata stored in the active tier that identifies the live segments and the dead segments, wherein the recipes specify byte ranges of the identified regions of the identified containers;

writing the recipes to a Uniform Resource Locator (URL); and detecting an event that the recipes have been written to the URL;

invoking functions in the serverless cloud system in response to detecting the event; and performing the recipes by the functions, wherein the functions copy the live segments to new regions in new containers from the identified containers by copying data in the byte ranges of the identified regions to the new containers and then deleting the identified containers, wherein the live segments are copied forward without regard to format, compression status, and encryption status.

2. The method of claim 1, wherein the regions comprise compression regions, wherein each recipe identifies at least a container, a location of a compression region in the container, a size of the compression region, and a destination container for storing the live segments, wherein the live segments are stored in a new compression region in the destination container.

3. The method of claim 1, wherein the recipes are performed by a plurality of the functions such that cloud tier of data is cleaned in parallel.

4. The method of claim 1, further comprising updating the metadata stored in the active tier to reflect the locations of the new regions in the new containers stored in the cloud tier after performing the recipes.

5. The method of claim 1, further comprising identifying metadata of L0 and Lp containers stored in the cloud storage from the metadata for the cloud tier, the metadata of the L0 and Lp containers including fingerprints of segments in the L0 and Lp containers.

6. The method of claim 5, further comprising performing a lookup to identify live segments and dead segments of the Lp containers.

7. The method of claim 6, further comprising generating the recipes that allow the live segments from the Lp containers to be copied into new LP containers.

8. The method of claim 7, further comprising writing the new Lp containers locally and to the cloud tier.

9. The method of claim 8, further comprising copying metadata of the new Lp containers to a new CMETA container, wherein the new CMETA container is written locally and to the cloud tier.

10. The method of claim 1, further comprising:
iterating metadata sections of local CMETA containers to identify the live regions of L0 containers;
forming the recipes based on the local CMETA containers;
copying metadata corresponding to the recipes into a new CMETA container locally and replicating the new CMETA container to the cloud tier; and
deleting the Lp, L0 and CMETA containers from which live regions were copied forward to reclaim space in the cloud storage.

11. The method of claim 1, wherein the specified location comprises a URL of the cloud storage.

12. The method of claim 1, further comprising polling the cloud storage for a poll file written by the functions, wherein the poll file allows the data protection system to validate the recipes performed by the functions.

13. The method of claim 12, wherein the poll file comprises a checksum that is compared to a locally stored checksum.

14. A non-transitory computer readable medium comprising computer executable instructions that, when executed, perform a garbage collection operation in a cloud tier of data associated with a computing system that also has a local tier of data at an on-site installation, the cloud tier including cloud storage of a serverless cloud system, the method comprising:

processing metadata, stored in an active tier, for the cloud tier by a garbage collection engine of the on-site installation data protection system to identify containers in the cloud tier to be cleaned in the cloud storage, wherein the identified containers contain regions, wherein some of the regions include both dead segments and live segments;
generating recipes, by the garbage collection engine, that identify locations of the live segments in the identified regions of the identified containers based upon metadata stored in the active tier that identifies the live segments and the dead segments, wherein the recipes specify byte ranges of the identified regions of the identified containers;
writing the recipes to a Uniform Resource Locator (URL); and
detecting an event that the recipes have been written to the URL;
invoking functions in the serverless cloud system in response to detecting the event; and
performing the recipes by the functions, wherein the functions copy the live segments to new regions in new containers from the identified containers by copying data in the byte ranges of the identified regions to the new containers and then deleting the identified containers, wherein the live segments are copied forward without regard to format, compression status, and encryption status.

15. The non-transitory computer readable medium of claim 14, wherein the regions comprise compression regions, wherein each of the recipes identifies at least an existing container, a location of a compression region, a size of the compression region, and a destination container for storing the live segments, wherein the live segments are stored in a new compression region in the destination container.

16. The non-transitory computer readable medium of claim 14, wherein the specified location comprises a URL of the cloud storage.

17. The non-transitory computer readable medium of claim 14, further comprising polling the cloud storage for a poll file written by the functions, wherein the poll file allows the data protection system to validate the recipes performed by the functions.

18. The non-transitory computer readable medium of claim 14, further comprising:
identifying metadata of L0 and Lp containers stored in the cloud storage from the metadata, the metadata of the L0 and Lp containers including fingerprints of segments in the L0 and Lp containers;
performing a lookup to identify live segments and dead segments of the Lp containers;
generating the recipes that allow the live segments from the Lp containers to be copied into new LP containers;
writing the new Lp containers locally and to the cloud storage;
copying metadata of the new Lp containers to a new CMETA container, wherein the new CMETA container is written locally and to the cloud storage;
iterating metadata sections of local CMETA containers to identify live compression regions of L0 containers;
forming the recipes based on the local CMETA containers; and
copying the metadata corresponding to the recipes into a new CMETA container locally and replicating the new CMETA container to the cloud storage.

* * * * *